US009002024B2

(12) United States Patent
Nakadai et al.

(10) Patent No.: US 9,002,024 B2
(45) Date of Patent: Apr. 7, 2015

(54) REVERBERATION SUPPRESSING APPARATUS AND REVERBERATION SUPPRESSING METHOD

(75) Inventors: Kazuhiro Nakadai, Wako (JP); Ryu Takeda, Wako (JP); Hiroshi Okuno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 511 days.

(21) Appl. No.: 13/036,937

(22) Filed: Feb. 28, 2011

(65) Prior Publication Data

US 2011/0268283 A1 Nov. 3, 2011

(30) Foreign Application Priority Data

Apr. 30, 2010 (JP) ................................ 2010-105369

(51) Int. Cl.

| | |
|---|---|
| ***H04B 3/20*** | (2006.01) |
| ***H04R 3/04*** | (2006.01) |
| *H04S 7/00* | (2006.01) |

(52) U.S. Cl.

CPC .. *H04R 3/04* (2013.01); *H04S 7/305* (2013.01)

(58) Field of Classification Search

CPC ................ G01L 2021/02082; G01L 21/0208; G01L 2021/02166; G01L 19/008; G01L 2021/02165; H04R 3/005; H04R 3/02; H04R 29/00; H04R 1/1083; H04R 2225/43; H04R 3/00; H04R 3/04; H04R 1/08; H04R 2430/03

USPC .................... 381/66, 56–58, 92, 96, 98, 387, 381/94.1–94.5; 379/406.01, 406.08, 379/406.14; 84/477 R, 611; 700/94

See application file for complete search history.

(56) References Cited

U.S. PATENT DOCUMENTS

| | | | | |
|---|---|---|---|---|
| 5,774,562 | A * | 6/1998 | Furuya et al. | 381/66 |
| 8,634,568 | B2 * | 1/2014 | Neoran et al. | 381/63 |
| 2006/0115095 | A1 * | 6/2006 | Giesbrecht et al. | 381/66 |
| 2008/0059157 | A1 * | 3/2008 | Fukuda et al. | 704/211 |
| 2009/0316923 | A1 * | 12/2009 | Tashev et al. | 381/66 |

FOREIGN PATENT DOCUMENTS

| | | | | |
|---|---|---|---|---|
| JP | 64-29093 | | 1/1989 | |
| JP | 64-29094 | | 1/1989 | |
| JP | 09-261133 | * | 3/1997 | H04B 3/20 |
| JP | 9-261133 | | 10/1997 | |
| JP | 10-56406 | | 2/1998 | |
| JP | 2002-237770 | | 8/2002 | |
| JP | 2009-159274 | | 7/2009 | |
| JP | 2009-276365 | | 11/2009 | |

OTHER PUBLICATIONS

Japanese Office Action for Application No. 2010-105369, 4 pages, dated Aug. 13, 2013.

* cited by examiner

*Primary Examiner* — Lun-See Lao

(74) *Attorney, Agent, or Firm* — Nelson Mullins Riley & Scarborough LLP; Anthony A. Laurentano; Matthew T. Fagan

(57) ABSTRACT

A reverberation suppressing apparatus, includes: a sound acquiring unit which acquires a sound signal; a reverberation data computing unit which computes reverberation data from the acquired sound signal; a reverberation characteristics estimating unit which estimates reverberation characteristics based on the computed reverberation data; a filter length estimating unit which estimates a filter length of a filter which is used to suppress a reverberation based on the estimated reverberation characteristics; and a reverberation suppressing unit which suppresses the reverberation based on the estimated filter length.

9 Claims, 11 Drawing Sheets

FIG. 9

| | |
|---|---|
| Impulse response | 16-kHz sampling |
| Reverberation time ($RT_{20}$) | 240 and 670 ms |
| Distance and direction | 1.5m and 0°, 45°, 90°, -45°, -90° |
| Number of microphones | Two (embedded in Robot's head) |
| STFT analysis | Hanning: 32ms and shift: 12ms |
| Input wave data | [-1.0 1.0]normalized |

FIG. 10

| | |
|---|---|
| Test set | 200 sentences |
| Training set | 200 persons (150 sentences each) |
| Acoustic model | PTM-triphone: 3-state, HMM |
| Language model | Statistical, vocabulary size 20k |
| Speech analysis | Hanning: 32ms and shift: 10ms |
| Features | MFCC 25 dim. (12+Δ12+ΔPow) |

FIG. 11

| | | Env. I ($RT_{20}$ 240 ms) | | | Env. II (RT20 670ms) | | |
|---|---|---|---|---|---|---|---|
| | Mmax | 20 | 30 | 50 | 30 | 40 | 50 |
| w/o noise | Mean | 14.0 | 13.7 | 13.2 | 35.0 | 35.3 | 35.4 |
| | Std. | 0.43 | 0.46 | 0.53 | 1.22 | 1.24 | 1.28 |
| with noise | Mean | 14.2 | 14.0 | 13.6 | 36.1 | 36.3 | 36.2 |
| | Std. | 1.25 | 1.17 | 1.05 | 2.38 | 2.41 | 2.30 |

FIG. 12

| | Exp. B (non-barge-in) | | | | Exp. C (barge-in) | | | |
|---|---|---|---|---|---|---|---|---|
| | no proc. | 2s | 2.5s | 3s | no proc. | 2s | 2.5s | 3s |
| Env. I ($RT_{20}$ 240ms) | 74.3 | 76.9 | 78.5 | 78.2 | 28.2 | 67.8 | 70.2 | 71.7 |
| Env. II ($RT_{20}$ 670ms) | 26.1 | 63.9 | 66.8 | 69.2 | 11.0 | 37.1 | 41.2 | 43.3 |

REVERBERATION SUPPRESSING APPARATUS AND REVERBERATION SUPPRESSING METHOD

BACKGROUND OF THE INVENTION

1. Field of the Invention

The present invention relates to a reverberation suppressing apparatus and a reverberation suppressing method.

Priority is claimed on Japanese Patent Application No. 2010-105369, filed Apr. 30, 2010, the content of which is incorporated herein by reference.

2. Description of Related Art

A reverberation suppressing process is an important technology used as a pre-process of auto-speech recognition, aiming at improvement of articulation in a teleconference call or a hearing aid and improvement of a recognition rate of auto-speech recognition used for speech recognition in a robot (robot hearing sense). In the reverberation suppressing process, reverberation is suppressed by calculating a reverberation component from an acquired sound signal every predetermined frames and by removing the calculated reverberation component from the acquired sound signal (see, for example, Unexamined Japanese Patent Application, First Publication No. H09-261133).

SUMMARY OF THE INVENTION

However, in the known technology described in Unexamined Japanese Patent Application, First Publication No. H09-261133, because a reverberation suppressing process is performed in a predetermined frame length, when the frame length is long, the process takes a long time. On the other hand, when the frame length is too short, reverberation cannot be effectively suppressed.

To solve the above-mentioned problems, it is therefore an object of the invention to provide a reverberation suppressing apparatus and a reverberation suppressing method which can suppress reverberation with high accuracy.

A reverberation suppressing apparatus according to an aspect of the invention includes: a sound acquiring unit which acquires a sound signal; a reverberation data computing unit which computes reverberation data from the acquired sound signal; a reverberation characteristics estimating unit which estimates reverberation characteristics based on the computed reverberation data; a filter length estimating unit which estimates a filter length of a filter which is used to suppress a reverberation based on the estimated reverberation characteristics; and a reverberation suppressing unit which suppresses the reverberation based on the estimated filter length.

In the reverberation suppressing apparatus, the reverberation characteristics estimating unit may estimates a reverberation time based on the computed reverberation data, and the filter length estimating unit may estimate the filter length based on the estimated reverberation time.

In the reverberation suppressing apparatus, the filter length estimating unit may estimate the filter length based on a rate between a direct sound and an indirect sound.

The reverberation suppressing apparatus may further include an environment detecting unit which detects a change in an environment where the reverberation suppressing apparatus is set, and the reverberation data computing unit may compute the reverberation data when the change in the environment is detected.

In the reverberation suppressing apparatus, when the environment detecting unit detects the change in the environment, the reverberation suppressing unit may switch, based on the detected environment, at least one of a parameter used by the reverberation suppressing unit to suppress the reverberation and a parameter used by the filter length estimating unit to estimate the filter length.

The reverberation suppressing apparatus may further include a sound output unit which outputs a test sound signal, the sound acquiring unit may acquire the output test sound signal, and the reverberation data computing unit may compute the reverberation data from the acquired test sound signal.

A reverberation suppressing method according to an aspect of the invention includes the following steps of: acquiring a sound signal; computing reverberation data from the acquired sound signal; estimating reverberation characteristics based on the computed reverberation data; estimating a filter length of a filter which is used to suppress a reverberation based on the estimated reverberation characteristics; and suppressing the reverberation based on the estimated filter length.

According to the invention, since the reverberation data is computed from the acquired sound signal, the reverberation characteristics is estimated based on the computed reverberation data, and the filter length of the filter which is used to suppress the reverberation is estimated based on the estimated reverberation characteristics, it is possible to efficiently suppress the reverberation based on the reverberation characteristics with high accuracy.

According to the invention, since the filter length is estimated based on the reverberation time of the estimated reverberation characteristics, it is possible to efficiently suppress the reverberation with higher accuracy.

According to the invention, since the filter length is estimated based on the rate between the direct sound and the indirect sound, it is possible to efficiently suppress the reverberation based on the reverberation characteristics with higher accuracy.

According to the invention, since the change in the environment where the reverberation suppressing apparatus is set is detected, the reverberation data is computed and the reverberation characteristics is estimated when the change in the environment is detected, and the filter length of the filter which is used to suppress the reverberation is estimated based on the estimated reverberation characteristics, it is possible to efficiently suppress the reverberation with higher accuracy.

According to the invention, since at least one of the parameter used by the reverberation suppressing unit to suppress the reverberation and the parameter used by the filter length estimating unit to estimate the filter length is switched based on the detected environment, it is possible to efficiently suppress the reverberation with higher accuracy.

According to the invention, since the sound output unit outputs the test sound signal used to compute the reverberation data, the sound acquiring unit acquires the output test sound signal, the reverberation data is computed from the acquired test sound signal, and the filter length of the filter which is used to suppress the reverberation is estimated based on the estimated reverberation characteristics, it is possible to efficiently suppress the reverberation with higher accuracy.

BRIEF DESCRIPTION OF THE DRAWINGS

FIG. 9 is a diagram illustrating data and setting conditions of the reverberation suppressing apparatus used in tests according to the first embodiment of the invention.

FIG. 10 is a diagram illustrating setting conditions of speech recognition according to the first embodiment of the invention.

FIG. 11 is a diagram illustrating setting conditions of speech recognition according to the first embodiment of the invention.

FIG. 12 is a diagram illustrating an example of the speech recognition rate using an estimated filter length according to the first embodiment of the invention.

DETAILED DESCRIPTION OF THE INVENTION

Hereinafter, example embodiments of the invention will be described in detail with reference to FIGS. 1 to 17. However, the invention is not limited to the embodiments, but may be modified in various forms without departing from the technical spirit thereof.

First Embodiment

Figure 1:
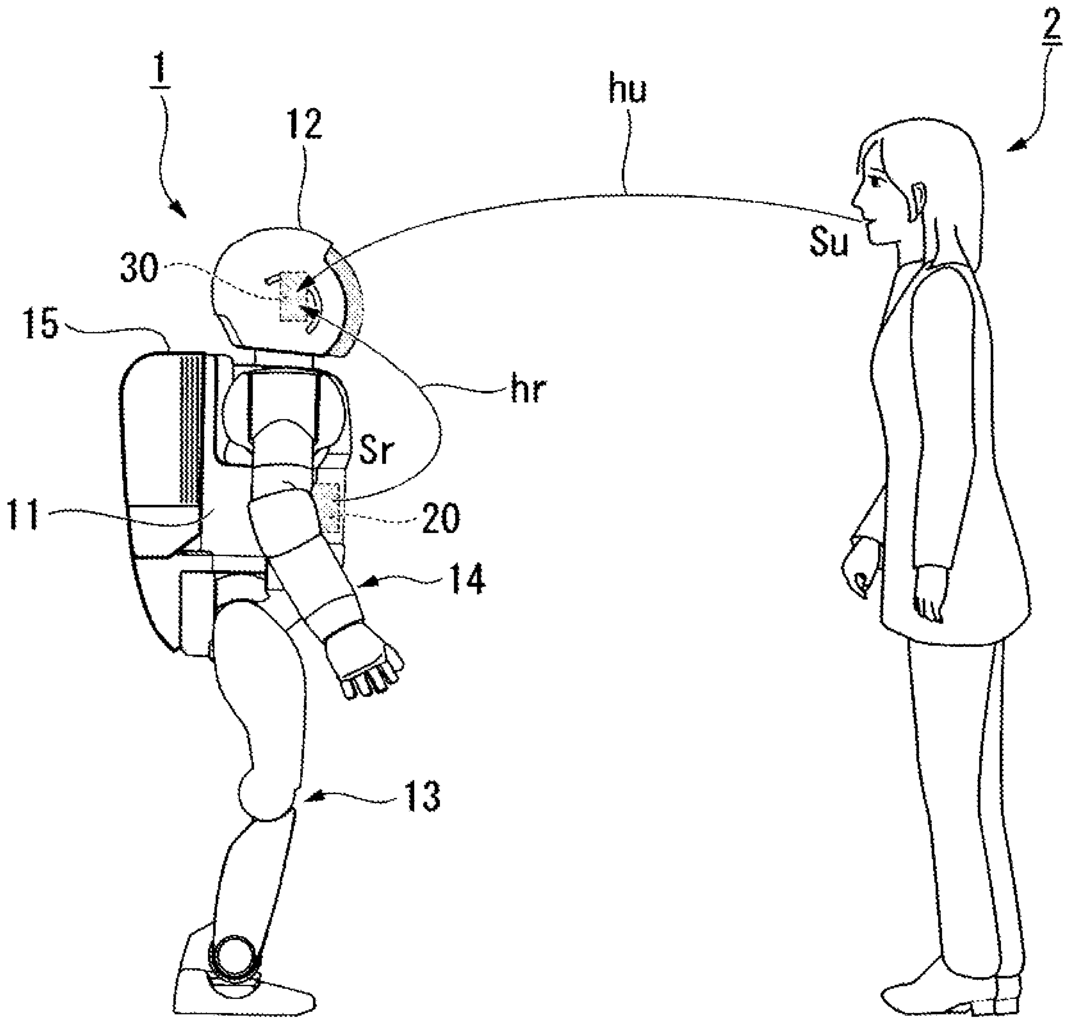
FIG. 1 is a diagram illustrating an example where a sound signal is acquired by a robot mounted with a reverberation suppressing apparatus according to a first embodiment of the invention.

FIG. 1 is a diagram illustrating an example where a sound signal is acquired by a robot mounted with a reverberation suppressing apparatus according to a first embodiment of the invention. As shown in FIG. 1, a robot 1 includes a body part 11, a head part 12 (movable part), a leg part 13 (movable part), and an arm part 14 (movable part). The head part 12, the leg part 13, and the arm part 14 are movably connected to the body part 11. In the robot 1, the body part 11 is provided with a housing part 15 which is carried on the back thereof speaker 20 (sound output unit 140) is housed in the body part 11 and a microphone 30 is hosed in the head part 12. In FIG. 1, the robot 1 is viewed from the side and plural microphones 30 and plural speakers 20 are provided.

The first embodiment of the invention will be first described roughly.

As shown in FIG. 1, a sound signal output from the speaker 20 of the robot 1 is described as a speech $S_r$ of the robot 1.

Speech interruption by a person 2 when the robot 1 is speaking is called barge-in. When barge-in is being generated, it is difficult to recognize the speech of the person 2 due to the speech of the robot 1.

When the person 2 and the robot 1 speak, a sound signal $h_u$ of the person 2 including reverberation, which is a speech $S_u$ of the person 2 delivered via a space, and a sound signal $h_r$ of the robot 1 including reverberation, which is the speech Sr of the robot 1 delivered via the space, are input to the microphone 30 of the robot 1.

In FIG. 1, when the sound signal collected by the microphone 30 of the robot 1 is modeled, it is represented as $h_u+h_r=H_u \cdot S_u+H \cdot S_r$. $H_u$ and H are frequency domain functions. In $H_u \cdot S_u+H \cdot S_r$, the speech $S_r$ of the robot 1 is known. Among the sound signal collected by the microphone 30, reverberation (echo) is added to $H_u \cdot S_u$ during a period when the speech of the person 2 is delivered from the person 2 to the robot 1. Therefore, it is expected that higher recognition rate can be obtained when speech recognition is performed using $S_u$ rather than using $H_u \cdot S_u$. H is calculated by acquiring via the microphone 30 sound data when only the robot 1 speaks via the speaker 20, and analyzing reverberation characteristics in an environment where the robot 1 is present. Further, in this embodiment, the reverberation is cancelled, that is, suppressed using an MCSB-ICA (Multi-Channel Semi-Blind ICA) based on an ICA (Independent Component Analysis). The number of frames tailored to the environment where the robot 1 is present is calculated by estimating the number of frames of the separation filter of the MCSB-ICA based on the calculated reverberation characteristics. Finally, the sound signal $S_r$ of the person 2 is calculated by suppressing reverberation components using the calculated number of frames.

Figure 2:
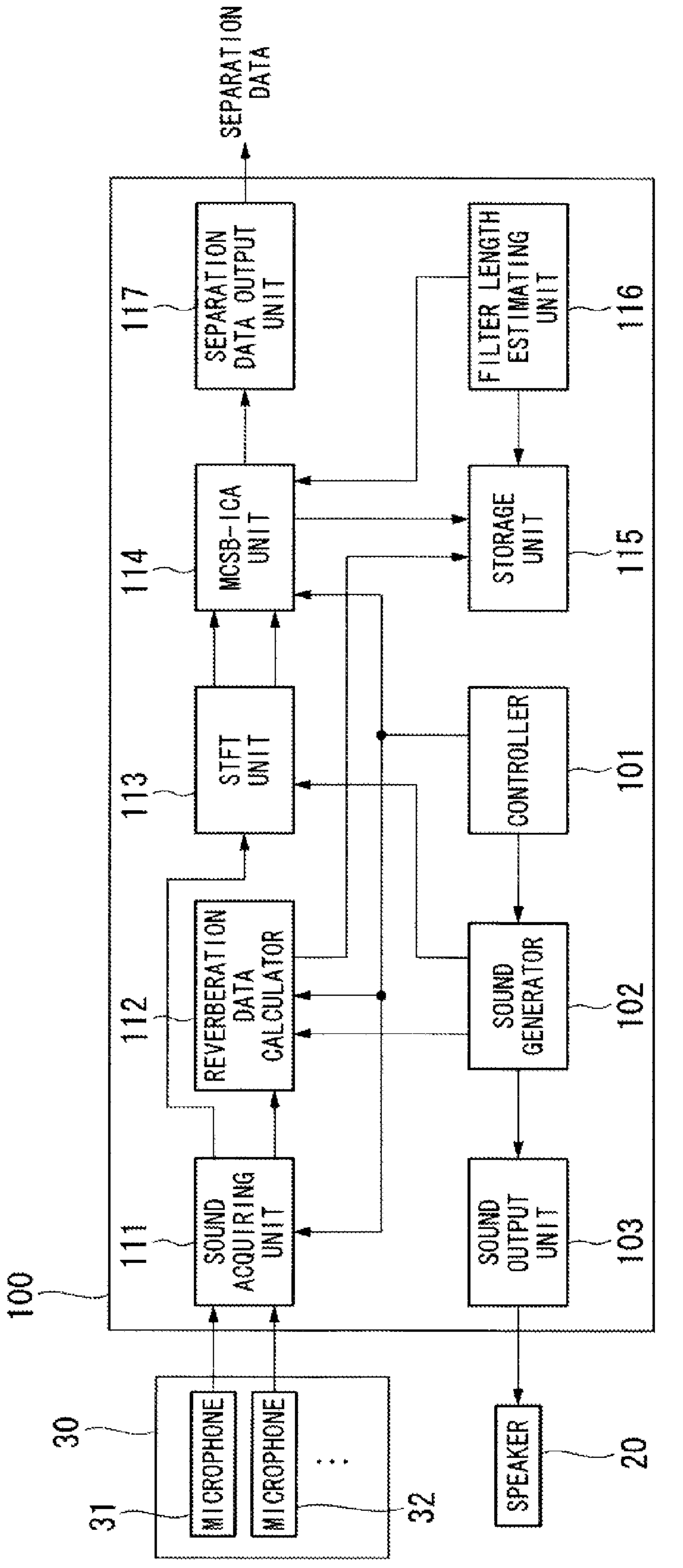
FIG. 2 is a block diagram illustrating a configuration of the reverberation suppressing apparatus according to the first embodiment of the invention.

FIG. 2 is a block diagram illustrating the configuration of the reverberation suppressing apparatus 100 according to this embodiment. As shown in FIG. 2, the microphone 30 and the speaker 20 are connected to the reverberation suppressing apparatus 100, and the microphone 30 includes plural microphones 31, 32, . . . . The reverberation suppressing apparatus 100 includes a controller 101, a sound generator 102, a sound output unit 103, a sound acquiring unit 111, a reverberation data calculator 112, an STFT unit 113, an MCSB-ICA unit 114, a storage unit 115, a filter length estimating unit 116, and a separation data output unit 117.

The controller 101 outputs to the sound generator 102 an instruction of generating and outputting a sound for measuring the reverberation characteristics, and outputs to the sound acquiring unit 111 and the MCSB-ICA unit 114 a signal representing that the robot 1 is emitting a sound for measuring the reverberation characteristics.

The sound generator 102 generates a sound signal (test signal) for measuring the reverberation characteristics based on the instruction from the controller 101, and outputs the generated sound signal to the sound output unit 103.

The generated sound signal is input to the sound output unit 103. The sound output unit 103 amplifies the input sound signal to a predetermined level and outputs the amplified sound signal to the speaker 20.

The sound acquiring unit 111 acquires a sound signal collected by the microphone 30 and outputs the acquired sound signal to the STFT unit 113. When the instruction of generating and outputting a sound for measuring the reverberation characteristics is input from the controller 101, the sound acquiring unit 111 acquires the sound signal for measuring the reverberation characteristics and outputs the acquired sound signal to the reverberation data calculator 112.

The acquired sound signal and the generated sound signal are input to the reverberation data calculator (reverberation data computing unit) 112. The reverberation data calculator (reverberation data computing unit) 112 calculates a separation matrix $W_r$ for cancelling echo using the acquired sound signal, the generated sound signal, and equations stored in the storage unit 115. The reverberation data calculator 112 writes and stores the calculated separation matrix $W_r$ for cancelling echo in the storage unit 115.

Figure 3A:
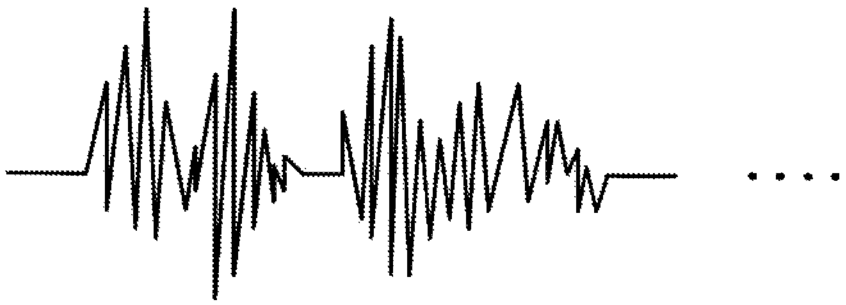
FIGS. 3A and 3B are diagrams illustrating an STFT process according to the first embodiment of the invention.
Figure 3B:
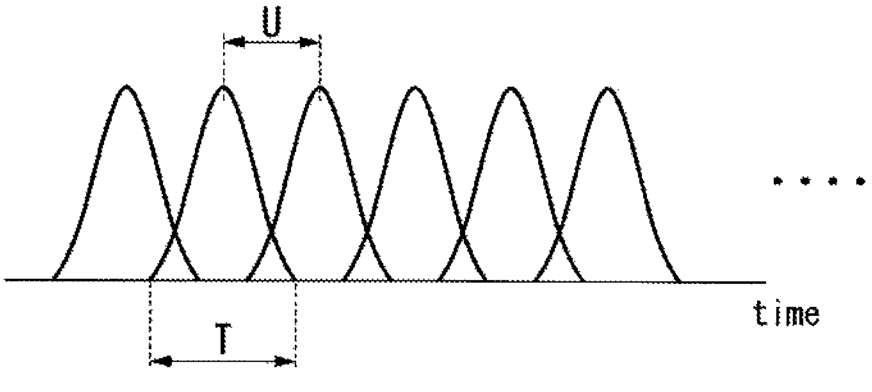

The acquired sound signal and the generated sound signal are input to the STFT (Short-Time Fourier Transformation) unit 113. The STFT unit 113 applies a window function such as a Hanning window function to the acquired sound signal and the generated sound signal, and analyzes the signals within a finite period while shifting an analysis position. The STFT unit 113 performs an STFT process on the acquired sound signal every frame t to convert the sound signal into a signal x(ω,t) in a time-frequency domain, performs the STFT process on the generated sound signal every frame t to convert the sound signal into a signal $s_r(\omega,t)$ in the time-frequency domain, and outputs the converted signals x(ω,t) and $s_r(\omega,t)$ to the MCSB-ICA unit 114 by the frequency a FIGS. 3A and 3B are diagrams illustrating the STFT process. FIG. 3A shows a waveform of the acquired sound signal and FIG. 3B shows the window function which is applied to the acquired sound signal. In FIG. 3B, reference sign U represents a shift length and reference sign T represents a period (window length) in which the analysis is performed.

The signal x(ω,t) and the signal $s_r(\omega,t)$ converted by the STFT unit 113 are input to the MCSB-ICA unit (reverberation suppressing unit) 114 by the frequency ω. Further, the signal representing that the robot 1 is emitting a sound for measuring the reverberation characteristics is input to the MCSB-ICA unit 114 from the controller 101, and filter length data estimated by the filter length estimating unit 116 is input to the MCSB-ICA unit 114. When the signal representing that the robot 1 is emitting a sound for measuring the reverberation characteristics has not been input, the MCSB-ICA unit 114 calculates separation filters $W_{1u}$ and $W_{2u}$ using the input signals x(ω,t) and $s_r(\omega,t)$, and the separation matrix $W_r$ for cancelling echo and the models and coefficients stored in the storage unit 115. After calculating the separation filters $W_{1u}$ and $W_{2u}$, a direct speech signal of the person 2 is separated from the sound signal acquired by the microphone 30 and the separated direct speech signal is output to the separation data output unit 117.

Figure 4:
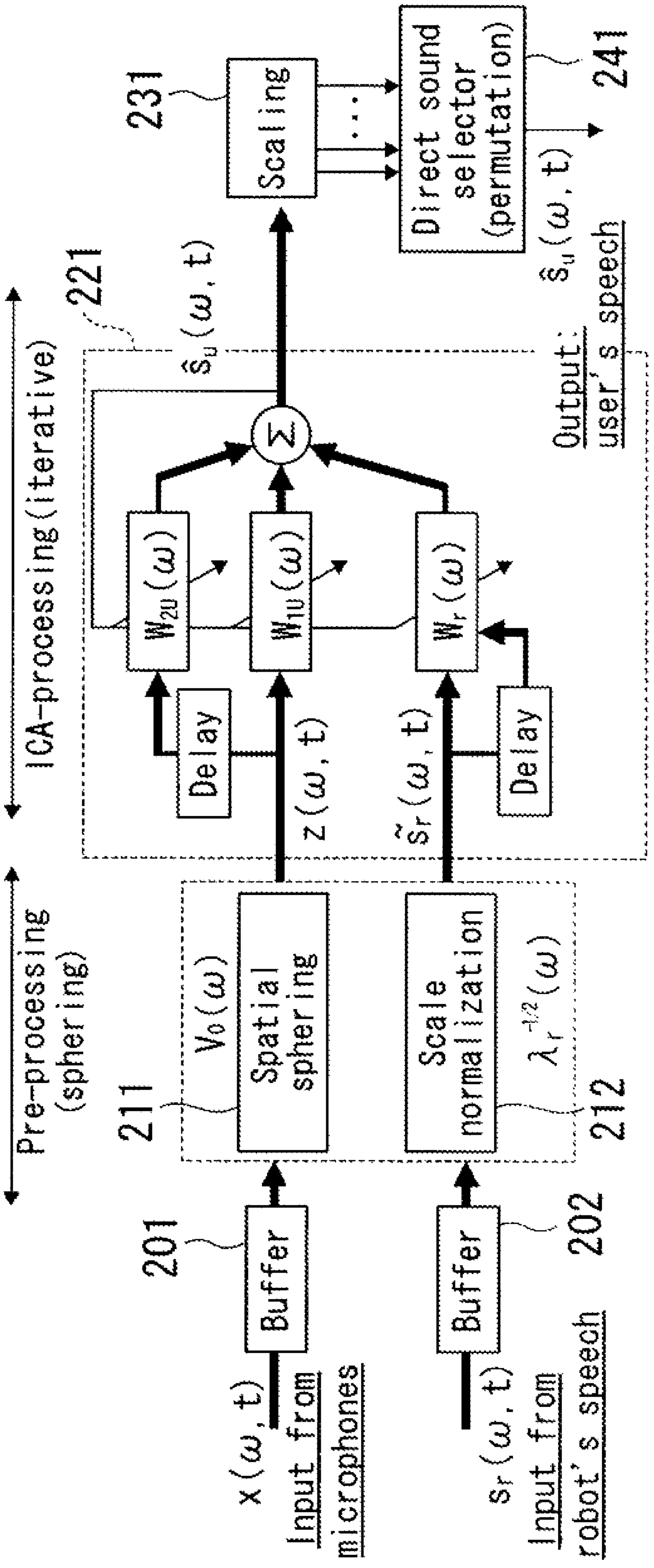
FIG. 4 is a diagram illustrating an internal configuration of an MCSB-ICA unit according to the first embodiment of the invention.

FIG. 4 is a diagram illustrating the internal configuration of the MCSB-ICA unit 114. As shown in FIG. 4, the signal x(ω,t) input from the STFT unit 113 is input to a forcible spatial spherization unit 211 via a buffer 201, and the signal $s_r(\omega,t)$ input from the STFT unit 113 is input to a variance normalizing unit 212 via a buffer 202. To an ICA unit 221, a spatially-spherized signal is input from the forcible spatial spherization unit 211 and a normalized signal is input from the variance normalizing unit 212. The ICA unit 221 repeatedly performs the ICA process on the input signals, outputs the calculation result to a scaling unit 231, and outputs the scaled signal to a direct sound separating unit 241. The scaling unit 231 performs a scaling process using a projection back process. The direct sound separating unit 241 selects the signal having the maximum power from the input signals and outputs the selected signal.

Models of the sound signal acquired by the robot 1 via the microphone 30, separation models used for analysis, parameters used for analysis, and the like are written and stored in the storage unit 115 in advance. The calculated separation matrix $W_r$ for cancelling echo, and the calculated separation filters $W_{1u}$ and $W_{2u}$ are written and stored in the storage unit 115.

The filter length estimating unit (reverberation characteristics estimating unit) 116 reads out the separation matrix $W_r$ for cancelling echo stored in the storage unit 115, estimates a filter length from the read separation matrix $W_r$ for cancelling echo, and outputs the estimated filter length to the MCSB-ICA unit 114. The method of estimating a filter length from the separation matrix $W_r$ for cancelling echo will be described later. Note that the filter length is a value relating to the number of frame sampling (i.e., the window), and the sampling is performed longer as the filter length increases.

The direct sound signal separated from the MCSB-ICA unit 114 is input to the separation data output unit 117. The separation data output unit 117 outputs the input direct sound signal to, for example, a speech recognizing unit (not shown).

A separation model for separating a necessary sound signal from the sound acquired by the robot 1 will be described. The sound signal acquired by the robot 1 via the microphone 30 can be defined like an FIR (Finite Impulse Response) model of Expression 1 in the storage unit 115.

$$x(t)=\sum_{n=0}^{N} h_u(n)s_u(t-n)+\sum_{m=0}^{M} h_r(m)s_r(t-n) \quad \text{Expression 1}$$

In Expression 1, x(t) is expressed as a vector $[x_1(t), x_2(t), \ldots, x_L(t)]^T$ of spectrums $x_1(t), \ldots, x_L(t)$ (where L is a microphone number) of the plural microphones 31, 32, . . . . Further, $s_u(t)$ is a spectrum of the speech of the person 2, $s_r(t)$ is a spectrum of the speech of the robot 1, $h_u(n)$ is an N-dimension FIR coefficient vector of the sound spectrum of the person 2, and $h_r(m)$ is an M-dimension FIR coefficient vector of the robot 1. $s_r(t)$ and $h_r(m)$ are known. Expression 1 represents a model of a sound signal acquired by the robot 1 via the microphone 30 at time t.

The sound signal collected by the microphone 30 of the robot 1 is modeled and stored in advance as a vector X(t) including a reverberation component as expressed by Expression 2 in the storage unit 115. The sound signal of the speech of the robot 1 is modeled and stored in advance as a vector $S_r(t)$ including a reverberation component as expressed by Expression 3 in the storage unit 115.

$$X(t)=[x(t), x(t-1), \ldots, x(t-N)]^T \quad \text{Expression 2}$$

$$S_r(t)=[s_r(t), s_r(t-1), \ldots, s_r(t-M)]^T \quad \text{Expression 3}$$

In Expression 3, $s_r(t)$ is the sound signal emitted from the robot 1, $s_r(t-1)$ represents that the sound signal is delivered via the space with a delay of "1", and $s_r(t-M)$ represents that the sound signal is delivered via the space with a delay of "M". That is, it represents that the reverberation component increases as the distance from the robot 1 is great and the delay increases.

To independently separate the known direct sounds $S_r(t)$ and X(t−d), and the direct speech signal $s_u$ of the person 2 using the ICA, the separation model of the MCSB-ICA is defined by Expression 4 and is stored in the storage unit 115.

$$\begin{pmatrix} \hat{s}(t) \\ X(t-d) \\ S_r(t) \end{pmatrix} = \begin{pmatrix} W_{1u} & W_{2u} & W_r \\ 0 & I_2 & 0 \\ 0 & 0 & I_r \end{pmatrix} \begin{pmatrix} x(t) \\ X(t-d) \\ S_r(t) \end{pmatrix} \quad \text{Expression 4}$$

In Expression 4, d (which is greater than 0) is an initial reflecting gap, and X(t−d) is a vector obtained by delaying X(t) by "d". Expression 5 is an estimated signal vector of L dimension.

$$\hat{s}(t) \quad \text{Expression 5}$$

$W_{1u}$ is an L×L blind separation matrix (separation filter), $W_{2u}$ is an L×L(N+1) matrix for removing a blind reverberation (separation filter), and $W_r$ is an L×(M+1) separation matrix for cancelling reverberation (i.e., reverberation elements based on the acquired reverberation characteristics).

$I_2$ and $I_r$ are unit matrixes having the corresponding sizes. In Expression 5, the direct speech signal of the person 2 and several reflected sound signals are included.

Parameters for solving Expression 4 will be described. In Expression 4, a separation parameter set $W=\{W_{1u}, W_{2u}, W_r\}$ is estimated as a difference scale between products of a coupling probability density function and peripheral probability density functions (peripheral probability density functions representing the independent probability distributions of the individual parameters) of s(t), X(t−d), and $S_r(t)$ so that KL (Kullback-Leibler) amount of information is minimized. The initial value $W_{1u}(\omega)$ of the separation matrix at frequency ω is set to an estimation matrix $W_{1u}(\omega+1)$ at frequency ω+1.

The MCSB-ICA unit 114 estimates the separation parameter set W by repeatedly updating the separation filters in accordance with rules of Expressions 6 to 9 so that the KL amount of information is minimized using a natural gradient method. Expressions 6 to 9 are written and stored in advance in the storage unit 115.

$$D=\Lambda-E[\phi(\hat{s}(t))\hat{s}^H(t)] \quad \text{Expression 6}$$

$$W_{1u}^{[j+1]}=W_{1u}^{[j]}+\mu DW_{1u}^{[j]} \quad \text{Expression 7}$$

$$W_{2u}^{[j+1]}=W_{2u}^{[j]}+\mu(DW_{2u}^{[j]}-E[\phi(\hat{s}(t))X^H(t-d)]) \quad \text{Expression 8}$$

$$W_r^{[j+1]}=W_r^{[j]}+\mu(DW_r^{[j]}-E[\phi(\hat{s}(t))S_r^H(t)]) \quad \text{Expression 9}$$

Note that in Expression 6 and Expressions 8 and 9, superscript H represents a conjugate transpose operation (Hermitian transpose). In Expression 6, Λ represents a nonholonomic restriction matrix, that is, a diagonal matrix of Expression 10.

$$E[\phi(\hat{s}(t))\hat{s}^H(t)] \quad \text{Expression 10}$$

In Expressions 7 to 9, u is a step-size parameter. φ(x) is a nonlinear function vector $[\phi(x_1), \phi(x_L)]^H$, which can be expressed by Expression 11. Expression 11 is written and stored in advance in the storage unit 115.

$$\phi(x) = -\frac{d}{dx}\log p(x) \quad \text{Expression 11}$$

The PDF of a sound source is $p(x)=\exp(-|x|/\sigma^2)/(2\sigma^2)$ which is a PDF resistance to noise and $\phi(x)=x^*/(2\sigma^2|x|)$, where $\sigma^2$ is the variance. It is assumed that x* is conjugate of x. These two functions are defined in a continuous region $|x|>\epsilon$.

Figure 5:
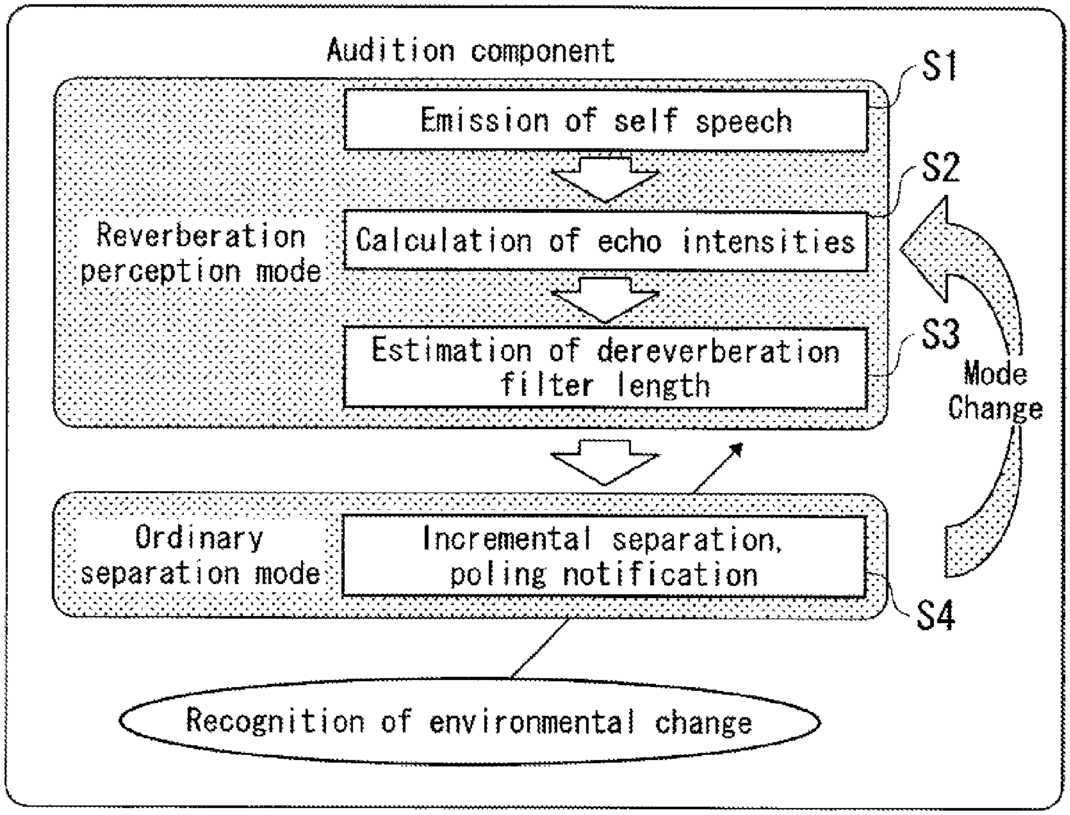
FIG. 5 is a diagram illustrating a sequence of processes of detecting reverberation intensity according to the first embodiment of the invention.

The procedure of the sound separation process will be described with reference to FIGS. 5 to 8. FIG. 5 is a diagram illustrating the procedure of process of detecting reverberation intensity according to this embodiment. The reverberation intensity is detected every time when an environment where the robot 1 is present changes. For example, the reverberation intensity is detected when the robot 1 moves to another room and the robot 1 moves outside the room. The robot 1 determines whether or not the environment changes by using image data captured by, for example, a camera (not shown) built in the robot 1. Alternatively, the reverberation intensity may be detected when the position of the robot 1 changes by the robot 1 being moved in the horizontal direction or in the vertical direction.

[Step S1; Emission of Self Speech]

Figure 6:
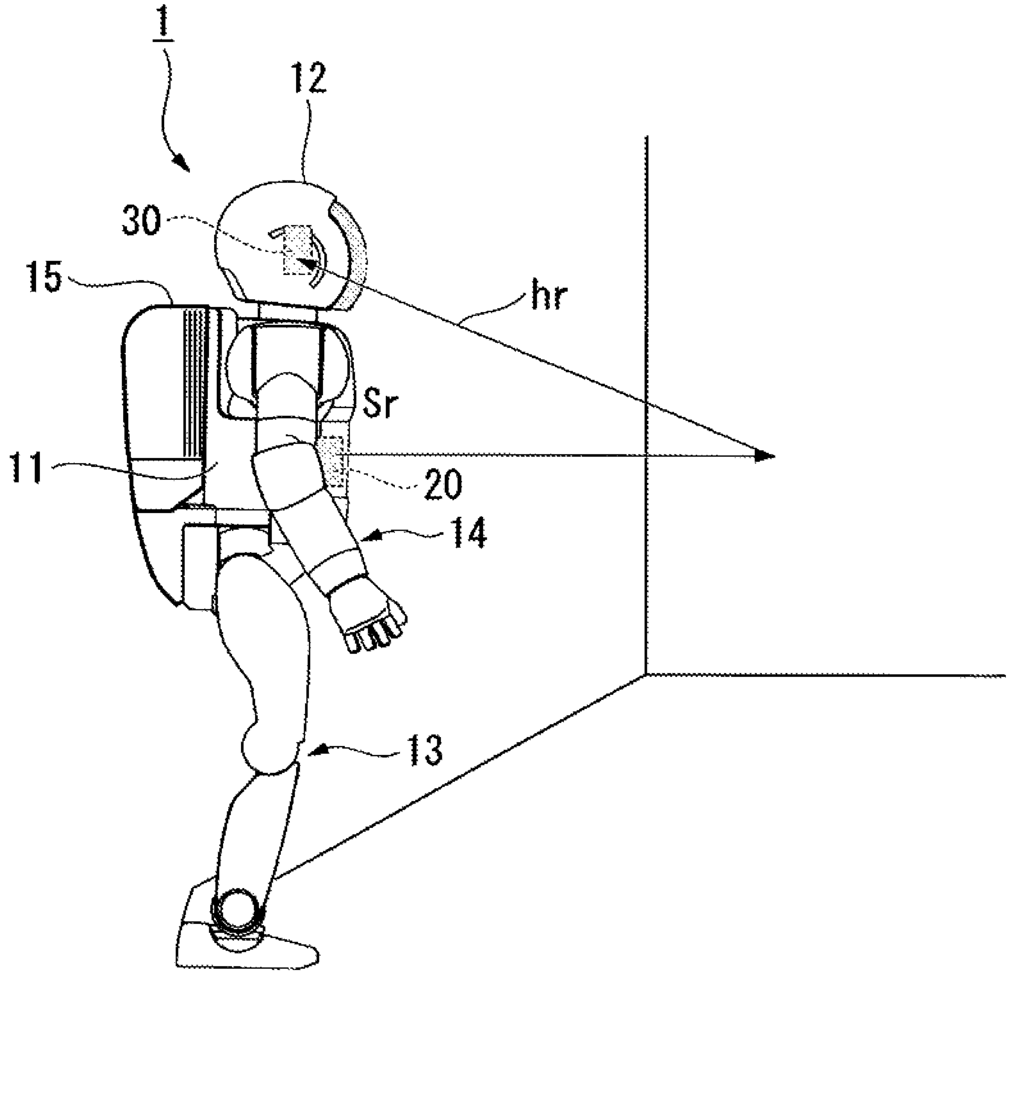
FIG. 6 is a diagram illustrating a state where a robot acquires a sound signal when only the robot is speaking according to the first embodiment of the invention.

As shown in FIG. 6, the controller 101 outputs to the sound generator 102 an instruction of generating a predetermined sound signal for measuring reverberation intensity in an environment where the robot 1 is present. When the instruction of generating a predetermined sound signal is input to the sound generator 102, the sound generator 102 generates the predetermined sound signal based on the input instruction, and outputs the generated predetermined sound signal to the sound output unit 103. When the generated predetermined sound signal is input to the sound output unit 103, the sound output unit 103 amplifies the input predetermined sound signal to a predetermined level and outputs the amplified sound signal to the speaker 20. The predetermined sound signal for measuring reverberation intensity may be formed of, for example, one vowel or one consonant. FIG. 6 is a diagram illustrating a state where the robot 1 acquires a sound signal via the microphone when only the robot 1 is speaking.

Next, the sound signal collected by the microphone 30 is input to the sound acquiring unit 111. The sound acquiring unit 111 outputs the input sound signal to the reverberation data calculator 112. The sound signal collected by the microphone 30 is a sound signal $h_r$ including the sound signal $S_r$ generated by the sound generator 102 and reverberation components resulting from the reflection of the sound emitted from the speaker 20 from the walls, the ceiling, and the floor.

When the acquired sound signal is input to the reverberation data calculator 112, the reverberation data calculator 112 calculates the separation matrix $W_r$ for cancelling echo using Expression 9 stored in the storage unit 115. The reverberation data calculator 112 writes and stores the calculated reverberation characteristics data in the storage unit 115. When the calculation using Expression 9 is performed, the filter length is set to "1" since the input value is $W_r$ only.

[Step S2; Calculation of Echo Intensities]

In Step S2, a graph of reverberation intensity for estimating the filter length is generated using $W_r$ calculated in Step S1.

The filter length estimating unit 116 reads out the separation matrix $W_r$ for cancelling echo stored in the storage unit 115. The filter length estimating unit 116 rewrites the read separation matrix $W_r$ for cancelling echo as Expression 12.

$$W_r=[w_r(0)w_r(1)\ldots w_r(M)] \quad \text{Expression 12}$$

In Expression 12, $w_r(m)$ is an L×1 vector and expressed as Expression 13.

$$W_r(m)=[w_r^1(m)w_r^2(m)\ldots w_r^L(M)]^T \quad \text{Expression 13}$$

The normalized power function of this filter at a frequency ω is defined by Expression 14.

$$p_r^i(\omega, m) = \frac{|\omega_r^i(\omega, m)|^2}{\max_m |\omega_r^i(\omega, m)|^2} \quad \text{Expression 14}$$

In Expression 14, i is a number of the microphone 30 (microphones 31, 32, . . . ) and m is a filter index. Since the power function of Expression 14 reflects the reverberation intensity and relates to the reverberation time in the environment, the reverberation time is estimated based on this power function.

The averaged power function of frequency and the averaged power function P of the microphones, and a logarithmic value of the function P are defined by Expression 15 and Expression 16 as a standard for calculating a reverberation time.

$$p(m) = \frac{\sum_i \sum_{\omega \in \Omega} p_r^i(\omega, m)}{\max_m \sum_i \sum_{\omega \in \Omega} p_r^i(\omega, m)} \quad \text{Expression 15}$$

$$L(m) = 20\log_{10} P(m) \quad \text{Expression 16}$$

Figure 7:
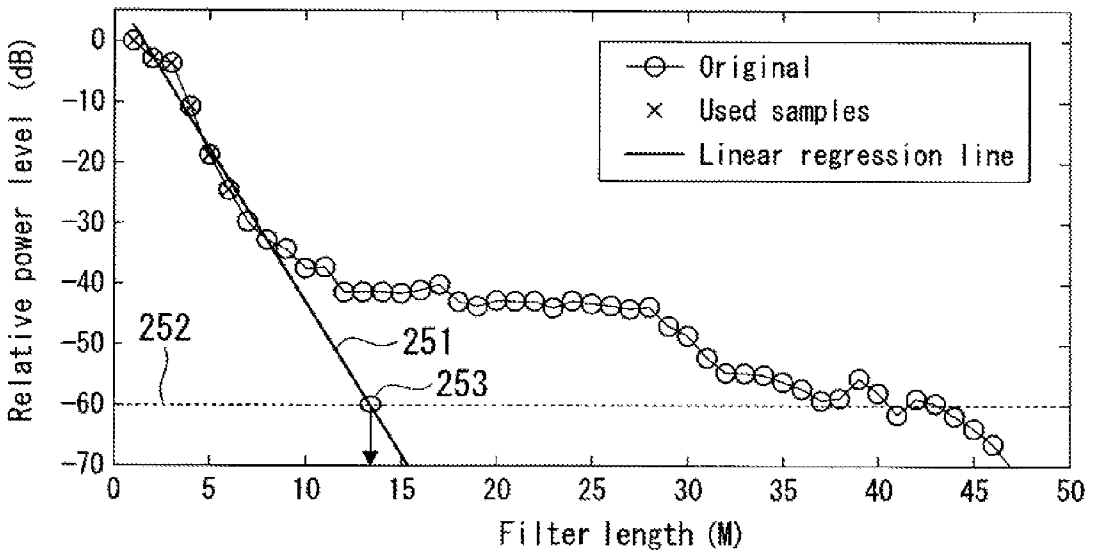
FIG. 7 is a diagram illustrating an example of reverberation intensity according to the first embodiment of the invention.

In Expression 15, Ω is a value which is based on a set of frequency bands. The filter length estimating unit 116 calculates reverberation intensity by using Expression 15 and Expression 16 and virtually plots the reverberation intensity as shown in FIG. 7. In FIG. 7, the vertical axis represents the sound level and the horizontal axis represents the time axis. As shown in FIG. 7, the sound level is the highest at time 0 when the generated sound signal is emitted from the speaker 20, and the sound level is decreased depending on the reverberation characteristics in the environment where the robot 1 is present.

[Step S3; Estimation of Dereverberation Filter Length]

In Step S3, the filter length M is estimated using the reverberation intensity plotted on the graph in FIG. 7.

As shown in FIG. 7, the filter length estimating unit 116 performs a linear regression analysis for estimating a filter length using Expression 17.

$$y = a \times m + b$$

In Expression 17, a and b are coefficients, m is a filter length index, and y is equivalent to L(m). Then, as shown in FIG. 7, the filter length estimating unit 116 extracts several samples from the peak values of P(m), and estimates a and b using the least mean square (LMS) method.

The filter length estimating unit 116 calculates a filter length for removing reverberation so that m in Expression 18 satisfies L(m)=$L_d$, and outputs the calculated filter length for removing reverberation to the ICA unit 221.

$$\hat{N} = \frac{L_d - b}{a} \quad \text{Expression 18}$$

For example, as shown in FIG. 7, a linear regression line 251 in the case of $RT_{20}$=240 ms ($RT_{20}$ is the reverberation time) is estimated using Expression 17. The estimated filter length is a value at an intersection point 253 of the linear regression line 251 and a line of $L_d$=−60 (i.e., a line 252) in Expression 18, that is, M is about 13.

[Step S4; Incremental Separation Poling Notification]

When the person 2 is speaking, a sound signal of the person 2 with reverberation components removed is calculated from the sound signal acquired from the microphone 30 by finding Expression 5 using Expression 4 in Step S4.

The sound signal collected by the microphone 30 is input to the sound acquiring unit 111. The sound acquiring unit 111 outputs the input sound signal to the STFT unit 113. The sound generator 102 generates a sound and outputs the generated sound signal to the STFT unit 113.

The sound signal acquired by the microphone 30 and the sound signal generated by the sound generator 102 are input to the STFT unit 113. The STFT unit 113 performs the STFT process on the acquired sound signal every frame t to convert the sound signal into a signal x(ω,t) in a time-frequency domain, and outputs the converted signal x(ω,t) to the MCSB-ICA unit 114 by the frequency ω. Further, the STFT unit 113 performs the STFT process on the generated sound signal every frame t to convert the sound signal into a signal $s_r(\omega,t)$ in the time-frequency domain, and outputs the converted signal $s_r(\omega,t)$ to the MCSB-ICA unit 114 by the frequency ω.

The converted signal x(ω,t) is output to the forcible spatial spherization unit 211 of the MCSB-ICA unit 114 by the frequency ω. The forcible spatial spherization unit 211 performs the spatial spherization process using the frequency ω as an index and using Expression 19, thereby calculating z(t). Expression 19 and Expression 20 are used to speed up the procedure of solving Expression 5.

$$z(t) = V_u x(t) \quad \text{Expression 19}$$

Here, $V_u$ is defined as Expression 20.

$$V_u = E_u \Lambda^{-\frac{1}{2}} E_u^H \quad \text{Expression 20}$$

In Expression 20, $E_u$ and $\Lambda_u$ are eigen vector matrixes and an eigen diagonal matrix $R_u = E|x(t)x^H(t)|$.

The converted signal $s_r(\omega,t)$ is input to the variance normalizing unit 212 of the MCSB-ICA unit 114 by the frequency ω. The variance normalizing unit 212 performs the scale normalizing process using the frequency ω as an index and using Expression 21.

$$\tilde{s}_r(t) = \lambda_r^{-\frac{1}{2}} s_r(t) \quad \text{Expression 21}$$

In the normalization of scaling, elements of inverse separation matrix is applied in accordance with the separation signal using the projection back method. The element $c_j$ of the i-th row and the j-th column of Expression 22 which satisfies Expression 23 and Expression 24 is used to the scaling of the j-th element of Expression 5.

$$\hat{H}_u = (W_{1u} V_0)^{-1} \quad \text{Expression 22}$$

$$l_j = \operatorname{argmax}_l |\hat{H}_u(l, j)| \quad \text{Expression 23}$$

$$c_j = \hat{H}_u(l_j, j) \quad \text{Expression 24}$$

The forcible spatial spherization unit 211 outputs z(ω,t) calculated in this manner to the ICA unit 221. The variance normalizing unit 212 outputs the value of Expression 21 calculated in this manner to the ICA unit 221.

The calculated z(ω,t) and the value of Expression 21 are input to the ICA 221. The ICA unit 221 reads out the separation model (separation filter) stored in the storage unit 115.

Then, the ICA unit 221 calculates $W_{1u}$ and $W_{2u}$ by substituting Expression 19 into x of Expressions 4 and 6 to 9 and substituting Expression 21 into s, and the MCSB-ICA unit 114 calculates data of Expression 5 using $W_r$ calculated in Step S1.

Figure 8:
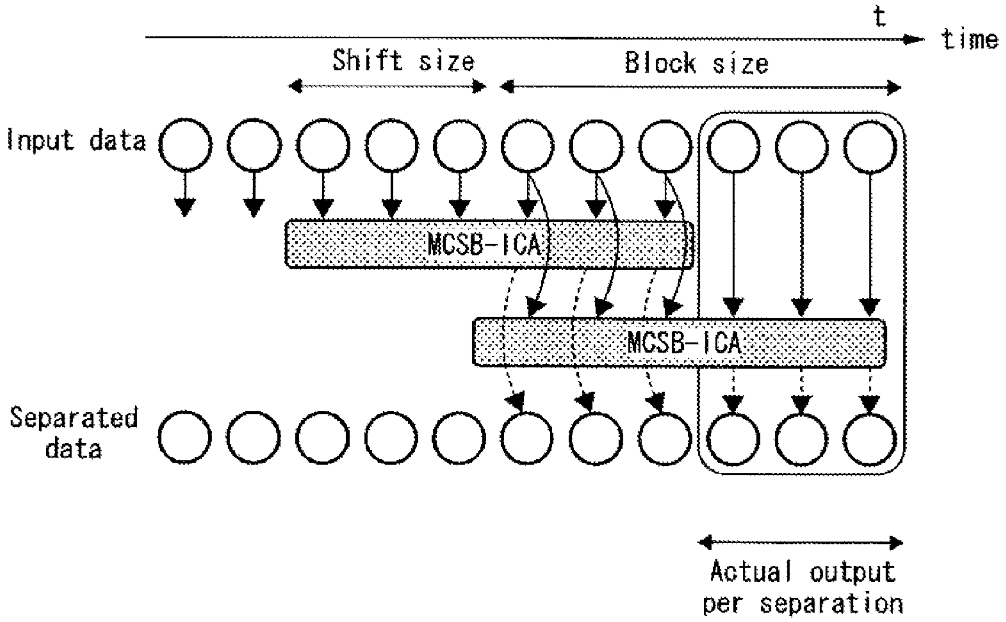
FIG. 8 is a diagram illustrating an example of change in an MCSB-ICA process according to the first embodiment of the invention.

FIG. 8 is a diagram illustrating an example of change in the MCSB-ICA process. In the normal separation mode, a block width increase separation of the MCSB-ICA is performed. The ICA buffers data for a predetermined time in order to reliably estimate the separation matrix. Since the buffer is used, a preceding block size $I_b$ is used for performing separation in time t. In FIG. 8, the delay time increases when the shift amount $I_s$ increases. Further, the calculation process increases when the shift amount $I_s$ decreases. In this manner, an overlap parameter coefficient $I_s$ is used in the present embodiment.

The test methods performed using the robot 1 having the reverberation suppressing apparatus according to this embodiment and the test results thereof will be described. FIGS. 9 to 12 show test conditions. FIG. 9 shows data and setting conditions of the reverberation suppressing apparatus used in the tests. As shown in FIG. 9, the impulse response was recorded as 16 kHz sample, the reverberation time was set to 240 ms and 670 ms, the distance between the robot 1 and the person 2 was 1.5 m, the angle between the robot 1 and the person 2 was set to 0°, 45°, 90°, −45°, and −90°, the number of used microphones 30 was two (disposed in the head part of the robot 1), the size of the hanning window in the STFT analysis was 32 ms (512 points) and the shift amount was 12 ms (192 points), and the input signal data was normalized into [−1.0, 1.0].

FIG. 10 is a diagram illustrating the setting of the speech recognition. As shown in FIG. 10, the test set was 200 sentences (Japanese), the training set was 200 people (150 sentences each), the acoustic model was PTM-triphone and three-value HMM (Hidden Markov model), the language model was a vocabulary size of 20 k, the speech analysis was set to a Hanning window size of 32 ms (512 points) and the shift amount of 10 ms, and the features was set to a MFCC (Mel-Frequency Cepstrum Coefficient: spectrum envelope) of 25-dimensions (12 dimensions+Δ12 dimensions+Δpower). As other STFT setting conditions, the frame gap coefficient was set to d=2, the filter length N for canceling the reverberation and the filter length M for removing the reverberation of the normal separation mode were set to the same value, a coefficient for the adaptive step size is set in advance, a coefficient for the estimated filter is set to $\Omega=\{5, 6, \ldots, 200\}$ and $L_d=-60$, and the sample number for the linear regression analysis is set to 6. The Julius (http://julius.sourceforge.jp/) was used as the speech recognition engine.

The test results are shown in FIGS. 11 to 16. FIG. 11 is a diagram illustrating setting conditions of the estimated filter length. FIG. 11 shows the average values and deviations of the estimated filter length for each of $M_{max}$ is 20, 30 and 50, and for each of the cases where: the noise is present and the reverberation time is 240 ms; the noise is present and the reverberation time is 670 ms; the noise is not present and the reverberation time is 240 ms; and the noise is not present and the reverberation time is 670 ms. Place 1 (Environment I) is a general room (reverberation time $RT_{20}$=240 ms) and Place 2 (Environment II) is a hole-like room (reverberation time $RT_{20}$=670 ms).

FIG. 12 is a drawing illustrating an example of the speech recognition rate using the estimated filter length. As shown in FIG. 12, Case B is a case where barge-in is not generated and Case C is a case where barge-in is generated. FIG. 12 shows the speech recognition rates for each of the reverberation time of 240 ms and 670 ms, for each of the cases where: the noise is not separated (no proc.); the block size $I_b$ is 166 (2 second); the block size $I_b$ is 208 (2.5 second); and the block size $I_b$ is 255 (3 second), and for each of Case B and Case C. The shift amount $I_s$ is set to half of the block size $I_b$. For example, the recognition rate of a clear sound signal without any reverberation is about 93% in the reverberation suppressing apparatus used in the tests.

Figure 13:
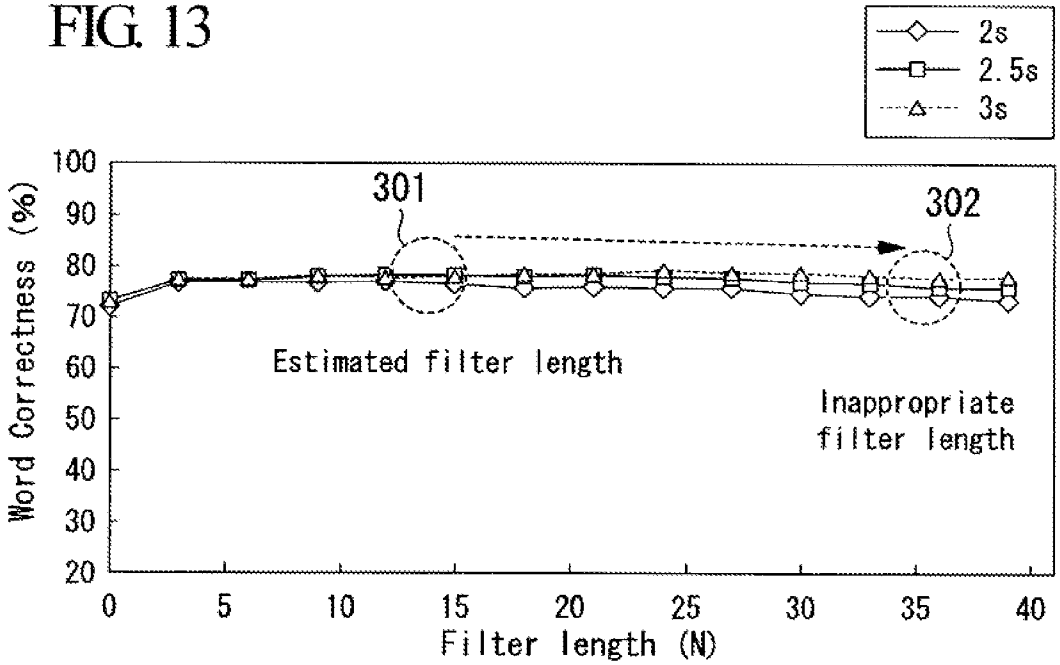
FIG. 13 is a graph illustrating speech recognition rates in Case B (without barge-in) and Place 1 according to the first embodiment of the invention.
Figure 14:
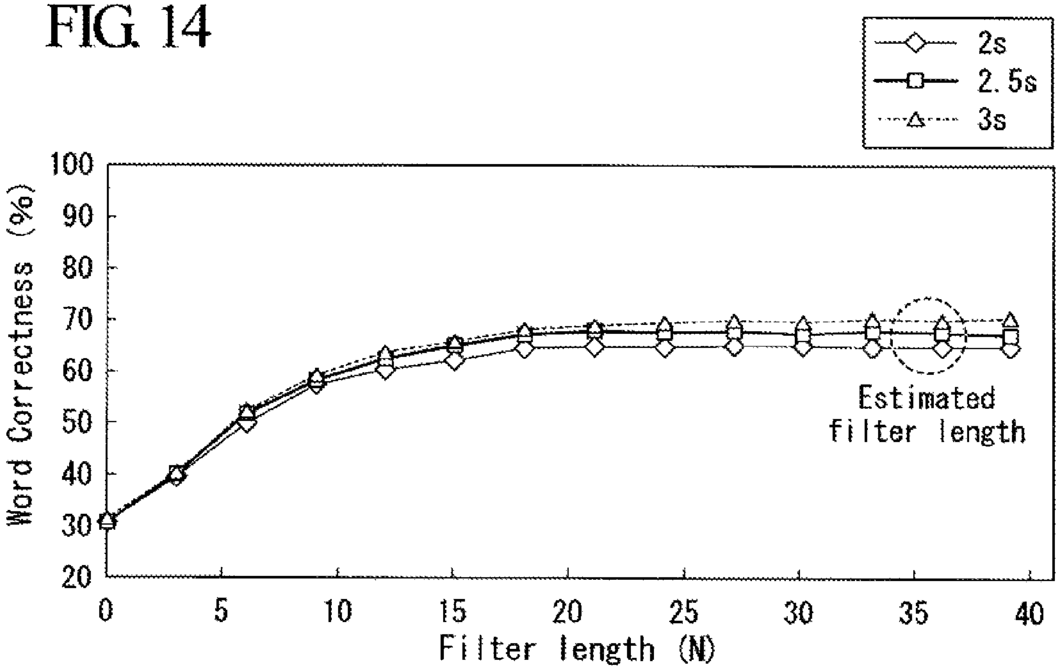
FIG. 14 is a graph illustrating speech recognition rates in Case B (without barge-in) and Place 2 according to the first embodiment of the invention.
Figure 15:
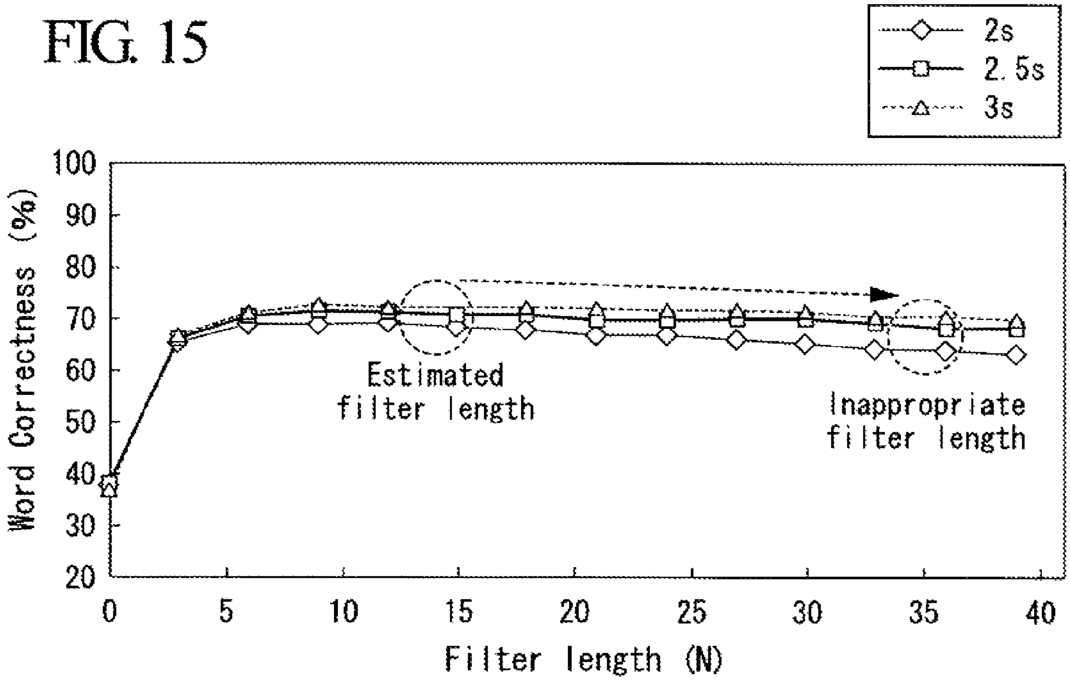
FIG. 15 is a graph illustrating speech recognition rates in Case C (with barge-in) and Place 1 according to the first embodiment of the invention.
Figure 16:
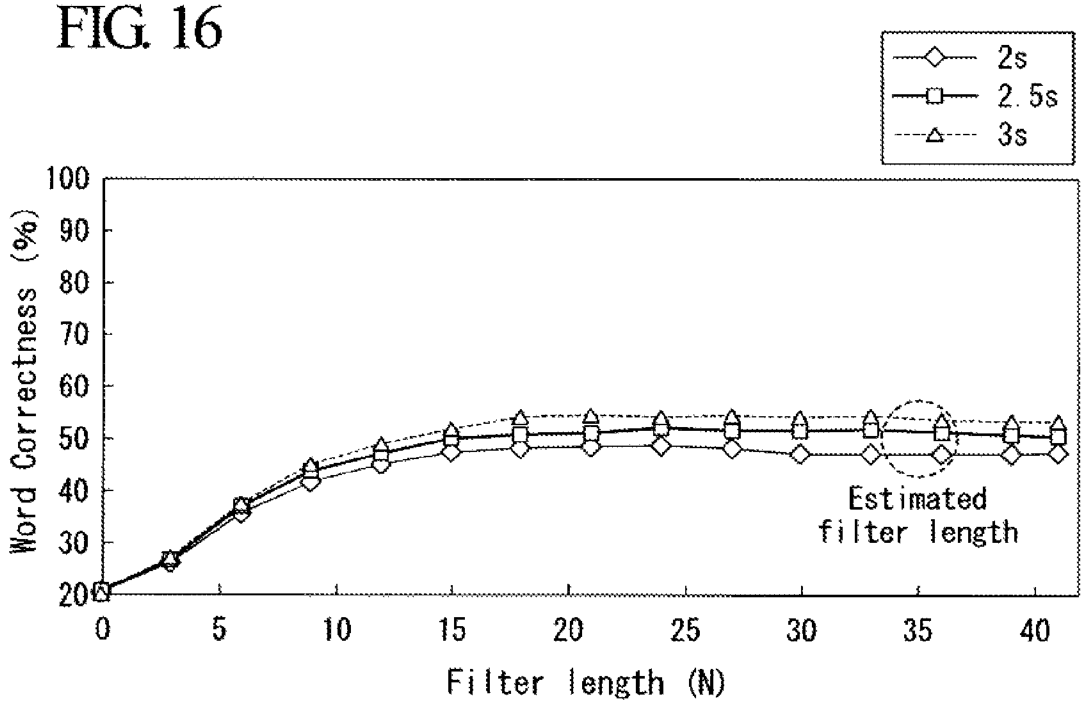
FIG. 16 is a graph illustrating speech recognition rates in Case C (with barge-in) and Place 2 according to the first embodiment of the invention.

FIGS. 13 to 16 are graphs illustrating the results of FIG. 12. FIG. 13 is a graph illustrating the speech recognition rates in Case B (without barge-in) and Place 1, and FIG. 14 is a graph illustrating the speech recognition rates in Case B (without barge-in) and Place 2. FIG. 15 is a graph illustrating the speech recognition rates in Case C (with barge-in) and Place 1, and FIG. 16 is a graph illustrating the speech recognition rates in Case C (with barge-in) and Place 2. The horizontal axis in the graphs represents the filter length (N) and the vertical axis represents the speech recognition rate (%).

As shown in FIG. 13, when the robot 1 is in a room (Place 1) where the reverberation time is short and barge-in is not generated, the recognition rate (i.e., the percentage of correct answers) is lower in the case of an inappropriate filter length (N=35) 302 than that in the case of an estimated filter length (N=14) 301. In the case of the filter length (N=35) 302, a difference occurs in the recognition rate due to the block size $I_b$. When the robot 1 is in a room (Place 2) where the reverberation time is long and barge-in is not generated, the recognition rate is greater than or equal to 60% in the case of the estimated filter length (N=35). As shown in FIGS. 13 and 14, the estimated filter length is short (N=14) when the reverberation time is short, and the estimated filter length is long (N=36) when the reverberation time is long. In this manner, it is possible to improve the speech recognition rate by estimating an appropriate filter length (frame length) based on the reverberation characteristics in the environment where the robot 1 acquires the sound signal.

As shown in FIG. 15, when the robot 1 is in the room (Place 1) where the reverberation time is short and barge-in is generated, the recognition rate (i.e., the percentage of correct answers) is lower in the case of an inappropriate filter length (N=35) than that in the case of an estimated filter length (N=14), and the difference in the recognition rate increases when the block length $I_b$ is changed. When the robot 1 is in the room (Place 2) where the reverberation time is long and barge-in is generated, the recognition rate is greater than or equal to 40% in the case of the estimated filter length (N=35).

As described above, since the flame length which is a separation filter length is set in accordance with the reverberation characteristics, it is possible to improve the speech recognition rate, and it is possible to appropriately set the calculation amount for the speech recognition.

Although it has been described in this embodiment that the reverberation time is used as the reverberation characteristics, D value (a value representing the clarity of the sound, which is a ratio between the power from 0 ms when the direct sound reaches to 50 ms and the power from 0 ms to a time when the sound decays) may be used.

It has been described in this embodiment that, when the instruction of generating and outputting a sound for measuring the reverberation characteristics is input from the controller 101, a sound signal for measuring the reverberation characteristics is acquired and the reverberation characteristics is measured. However, the sound acquiring unit 111 may determine whether or not barge-in is generated by comparing the acquired sound signal with the generated sound signal output from the sound generator 102, and may acquire the sound signal for measuring the reverberation characteristics when barge-in is not generated.

Second Embodiment

Figure 17:
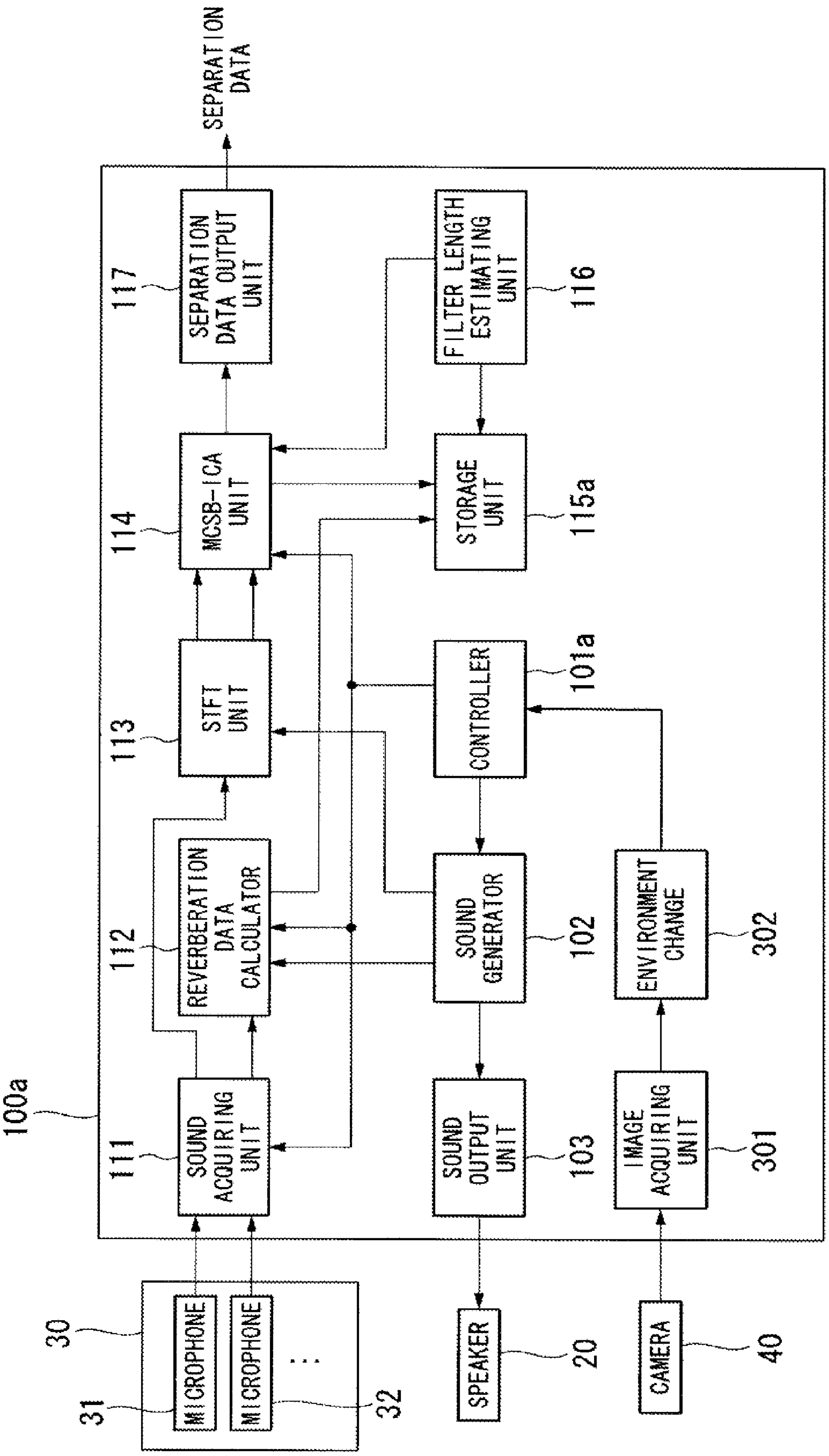
FIG. 17 is a block diagram illustrating a reverberation suppressing apparatus according to a second embodiment of the invention.

Hereinafter, a second embodiment of the invention will be described in detail with reference to FIG. 17. FIG. 17 is a block diagram illustrating a reverberation suppressing apparatus 100*a* according to this embodiment. It has been described in the first embodiment that, when the environment changes, the robot 1 speaks and the reverberation characteristics in the environment where the robot 1 is present is measured. In this embodiment, marks are set in every room where the robot 1*a* will move and a camera 40 of the robot 1 captures the set marks, and the reverberation characteristics is measured when the robot 1 detects the change in the environment, for example, the fact that the robot 1 has been moved, by detecting the marks using a known image recognition method. Alternatively, a map is written and stored in the storage unit 115 of the robot 1*a*, and the reverberation characteristics is measured when the robot 1 detects the change in the environment based on the map.

As shown in FIG. 17, the reverberation suppressing apparatus 100*a* of this embodiment further includes an image acquiring unit 301 and an environment change detecting unit 302. The reverberation suppressing apparatus 100*a* is connected to the camera 40. An image signal captured by the camera 40 is input to the image acquiring unit 301. The image acquiring unit 301 outputs the input image signal to the environment change detecting unit 302. The environment change detecting unit 302 determines whether or not the position of the robot 1*a* mounted with the reverberation suppressing apparatus 100*a* has changed based on the input image signal. When detecting the change of position, the environment change detecting unit 302 outputs a signal indicating the change of position to a controller 101*a*. When the signal indicating the change of position is input to the controller 101*a*, the controller 101*a* outputs an instruction of generating a sound signal (test signal) for measuring the reverberation characteristics to the sound generator 102. The following processes are the same as those in the first embodiment.

Alternatively, parameters for each environment which are associated with the map or the marks may be written and stored in the storage unit 115*a* in advance. The controller 101*a* may measure the reverberation characteristics and switch the set of parameters from the storage unit 115*a* when the robot 1 detects the change in the environment.

A reverberation may be measured under an environment where reverberation data is not stored in the storage unit 115*a* and parameters based on this environment may be calculated and stored in the storage unit 115*a* so as to associate the reverberation data with the measured reverberation characteristics.

A positional information transmitter (not shown) transmitting information on position to the robot 1*a* may be set in each room, and when the robot 1*a* receives the information on position, the robot 1*a* may detect the change in the environment and measure the reverberation characteristics.

Although it has been described in the first and second embodiments that the reverberation suppressing apparatus 100 and the reverberation suppressing apparatus 100*a* are mounted on the robot 1 (1*a*), the reverberation suppressing apparatus 100 and the reverberation suppressing apparatus 100*a* may be mounted on, for example, a speech recognizing apparatus or an apparatus having the speech recognizing apparatus.

The operations of the units may be embodied by recording a program for embodying the functions of the units shown in FIGS. 2 and 17 according to the embodiments in a computer-readable recording medium and reading the program recorded in the recording medium into a computer system to execute the program. Here, the "computer system" includes an OS or hardware such as peripherals.

The "computer system" includes a homepage providing environment (or display environment) using a WWW system.

Examples of the "computer-readable recording medium" include memory devices of portable mediums such as a flexible disk, an magneto-optical disk, a ROM (Read Only Memory), and a CD-ROM, a USB (Universal Serial Bus) memory connected via a USB I/F (Interface), and a hard disk built in the computer system. The "computer-readable recording medium" may include a medium dynamically keeping a program for a short time, such as a communication line when the program is transmitted via a network such as Internet or a communication circuit such as a phone line and a medium keeping a program for a predetermined time, such as a volatile memory in the computer system serving as a server or a client. The program may embody a part of the above-mentioned functions or may embody the above-mentioned functions in cooperation with a program previously recorded in the computer system.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A reverberation suppressing apparatus, comprising: a sound acquiring unit which acquires a sound signal; a reverberation data computing unit which computes reverberation data from the acquired sound signal;

a reverberation characteristics estimating unit which estimates reverberation characteristics based on the computed reverberation data;

a filter length estimating unit which estimates an amount of filtering time based on the estimated reverberation characteristics; wherein the filter length estimating unit estimates the filter length by calculating reverberation intensities for a plurality of sound levels, and performing a regression analysis with respect to the calculated reverberation intensities; and a reverberation suppressing unit which applies a filter having a filter length of the estimated amount of filtering time to suppress a reverberation of a received sound signal.

2. The reverberation suppressing apparatus according to claim 1, wherein:

the reverberation characteristics estimating unit estimates a reverberation time based on the computed reverberation data; and the filter length estimating unit estimates the filter length based on the estimated reverberation time.

3. The reverberation suppressing apparatus according to claim 1, wherein the filter length estimating unit estimates the filter length based on a rate between a direct sound and an indirect sound.

4. The reverberation suppressing apparatus according to claim 1, further comprising an environment detecting unit which detects a change in an environment where the reverberation suppressing apparatus is set, wherein the reverberation data computing unit computes the reverberation data when the change in the environment is detected.

5. The reverberation suppressing apparatus according to claim 4, wherein when the environment detecting unit detects the change in the environment, the reverberation suppressing unit switches, based on the detected environment, at least one of a parameter used by the reverberation suppressing unit to suppress the reverberation and a parameter used by the filter length estimating unit to estimate the filter length.

6. The reverberation suppressing apparatus according to claim 1, further comprising a sound output unit which outputs a test sound signal, wherein:

the sound acquiring unit acquires the output test sound signal; and the reverberation data computing unit computes the reverberation data from the acquired test sound signal.

7. A reverberation suppressing method, comprising the following steps of:

acquiring a sound signal;

computing reverberation data from the acquired sound signal;

estimating reverberation characteristics based on the computed reverberation data; estimating an amount of filtering time based on the estimated reverberation characteristics; and applying a filter having a filter length of the estimated amount of filtering time to suppress a reverberation of the received sound signal; wherein the filter length estimating unit estimates the filter length by calculating reverberation intensities for a plurality of sound levels, and performing a regression analysis with respect to the calculated reverberation intensities.

8. The apparatus of claim 6, wherein the reverberation data computing unit calculates a separation matrix (Wr) for cancelling an echo using the acquired sound signal and the generated sound signal.

9. A reverberation suppressing apparatus, comprising:

a sound acquiring unit which acquires a sound signal;

a reverberation data computing unit which computes reverberation data from the acquired sound signal;

a reverberation characteristics estimating unit which estimates reverberation characteristics based on the computed reverberation data;

a filter length estimating unit which estimates an amount of filtering time based on the estimated reverberation characteristics, wherein the amount of filtering time is estimated to be shorter as the acquired sound signal decays more quickly; wherein the filter length estimating unit estimates the filter length by calculating reverberation intensities for a plurality of sound levels, and performing a regression analysis with respect to the calculated reverberation intensities; and a reverberation suppressing unit which applies a filter having a filter length of the estimated amount of filtering time to suppress a reverberation of a received sound signal.

* * * * *